US006453115B1

(12) United States Patent
Boyle

(10) Patent No.: US 6,453,115 B1
(45) Date of Patent: Sep. 17, 2002

(54) DIGITAL VIDEO RECORDING SYSTEM WHICH GENERATES AN INDEX DATA STRUCTURE FOR DISPLAYING A VIDEO STREAM IN TRICKPLAY MODE

(75) Inventor: William B. Boyle, Lake Forest, CA (US)

(73) Assignees: Keen Personal Media, Inc., Irvine, CA (US); Keen Personal Technologies, Inc., Irvine, CA (US)

( * ) Notice: Subject to any disclaimer, the term of this patent is extended or adjusted under 35 U.S.C. 154(b) by 0 days.

(21) Appl. No.: 09/652,729

(22) Filed: Aug. 31, 2000

(51) Int. Cl.$^7$ ................................................ H04N 5/91
(52) U.S. Cl. ......................... 386/68; 386/111; 386/125
(58) Field of Search ........................... 386/6–8, 33, 45, 386/68–70, 81–83, 95, 111–112, 125–126; 348/578

(56) References Cited

U.S. PATENT DOCUMENTS 5,377,051 A * 12/1994 Lane et al. .................... 386/81
5,949,948 A * 9/1999 Krause et al. ................. 386/6
5,959,690 A * 9/1999 Toebes, VIII et al. ...... 348/578
6,021,250 A * 2/2000 Hyodo et al. ................. 386/95
6,141,486 A   10/2000 Lane et al.

OTHER PUBLICATIONS

PCT International Search Report dated Feb. 21, 2002; PCT/US01/27411.

* cited by examiner

Primary Examiner—Thai Tran
Assistant Examiner—Christopher Onuaku
(74) Attorney, Agent, or Firm—Milad G. Shara, Esq.

(57) ABSTRACT

A system stores an incoming video stream in an MPEG format while simultaneously creating a look-up table of the logical block addresses (LBAs) of the memory locations at which frames of the video stream is stored. The system stores the look-up table and the associated MPEG stream on a personal video recorder (PVR) hard drive. The system uses the look-up table to rapidly access the starting points of the individual frames of the MPEG stream to enable rapid random access into the MPEG stream at logical start locations. The system provides the contents of the MPEG frames to an MPEG decompressor to thereby provide TrickPlay of the MPEG stream. The system employs a hardware comparator to rapidly flag the frame start locations within the MPEG stream and to thereby create the look-up table.

32 Claims, 7 Drawing Sheets

MPEG FRAME HEADER INFORMATION — 132

| WORD DESCRIPTION | No. OF BITS | VALUE |
|---|---|---|
| 135— PICTURE START CODE | 32 | 0X00000100 |
| 136—TEMPORAL REFERENCE | 10 | Dont Care |
| 140— PICTURE CODING TYPE | 3 | 001 => I Frame —103<br>010 => P Frame—105<br>011 => B Frame—107 |

FIGURE 3

DIGITAL VIDEO RECORDING SYSTEM WHICH GENERATES AN INDEX DATA STRUCTURE FOR DISPLAYING A VIDEO STREAM IN TRICKPLAY MODE

BACKGROUND OF THE INVENTION

1. Field of the Invention

This invention relates to the field of encoding and storing moving pictures and audio signals and, in particular, a system for digitally encoding, storing, and displaying a video stream in MPEG format on a personal video recorder (PVR) hard drive in a manner that facilitates play modes other than standard speed, sequential play.

2. Description of the Related Art

Personal Video Recorders (PVRs), also sometimes called Digital Video Recorders (DVRs), are digitally based devices that enable a viewer of television to receive and digitally record video programming, such as TV broadcasts, movie downloads, and the like, for more flexible viewing. For example, PVRs enable a viewer to record defined categories of live television programming over the course of days. The viewer may stipulate that they want to record a series of tennis matches, all nature shows, or all episodes of a particular show over the course of a season. PVRs also enable a person viewing a "live" television broadcast to pause viewing and, at a later time, resume viewing the broadcast from the point at which live viewing was paused. A viewer also has the option to skip portions of a broadcast, such as for example commercials, upon reviewing a broadcast by employing a PVR. The recording features of PVRs can be performed when the viewer is away from the PVR so that the viewer can view preferred programs at a time that is convenient.

PVRs can receive either a streaming analog signal in an uncompressed format or a digitally encoded signal, such as an MPEG signal, from a transmission source. If the PVR receives an analog signal such as a television signal in an uncompressed format, the PVR typically digitally encodes the signal, stores the digitally encoded signal in a compressed format, and decodes and presents the signal for subsequent viewing. Similarly, if the PVR receives an already digitally encoded signal, the PVR then stores the signal and decodes and presents the signal for subsequent viewing. PVRs currently typically include 13.6-gigabyte hard disks that offer up to 14 hours of video programming or 27.2-gigabyte disks that offer up to 30 hours of programmable viewing.

One common compression standard used for video streams currently used today is known as MPEG. MPEG is a standard for digitally encoding moving pictures and interleaved audio signals. MPEG facilitates compressing a video stream to reduce the storage capacity and transmission bandwidth required for an MPEG stream as compared to an uncompressed video stream. In a typical video stream, adjacent individual video frames will have much in common with the preceding and subsequent frames. For example, from one individual still frame of a scene to the next, much of the background, the colors, and the luminous intensity will usually remain the same. A relatively small amount of the overall scene will typically change from frame to frame. The compression technique used with MPEG leverages this redundancy of video in both the spatial and temporal dimensions in order to define certain frames with respect to other frames in a dependent or anticipatory manner and thereby reduce the amount of information required to accurately define a video stream.

In particular, the MPEG standard defines three types of frame formats: Intra-coded reference frames (I), Predictive-coded frames (P), and Bi-directionally predictive-coded frames (B). I frames contain all of the information required for a single video frame and are thus independent frames that need no information from other frames either before or after for decoding. On the other hand, P frames are defined with respect to preceding I frames or other P frames. B frames are bi-directionally defined with respect to both preceding and subsequent frames in the MPEG stream. Thus, both P and B frames need information from surrounding frames for decoding; a P or B frame by itself cannot be decoded into a viewable image. The I-, P-, and B- frames are organized into at least one sequence defined by a sequence header and a set of subsequent I, P, and B frames. The sequence header contains display initialization information defining picture size and aspect ratio, frames and bit rate, decoder buffer size, and chroma pixel structure and may contain optional quantizer matrices and/or user data.

While digital video compression schemes, such as MPEG, reduce the storage and transmission bandwidth required for these digital video streams, these compression schemes result in video data that is not readily adaptable to non-standard modes of display. For example, viewers of video images like to be able to use TrickPlay modes of viewing including by way of example: fast forward, reverse play, skip ahead, skip back, etc. Generally, compressed video streams that have inter-frame dependencies, such as MPEG streams, are not readily suited to random access of different frames within the stream as is often required for TrickPlay modes of viewing.

For example, with an MPEG file, fast forward or fast reverse viewing of the full stream is not efficient because such modes of operation would still require the decoding of each of the P and B frames, which, in turn, may require decoding of multiple other frames. Hence, fast forward and fast reverse manners of display are not easily achievable due to the memory and processing required for the decoding of multiple frames that must be accomplished to reassemble the compressed data. Moreover, skipping to a particular segment within a video stream is also complicated by the fact that the particular segment desired may correspond to an interdependent frame which requires the decoding of multiple other frames before the desired frame can be viewed.

Hence, the MPEG compression standard as used to facilitate efficient transfer and storage of digital video data inhibits subsequent flexible viewing of the digital video data. As more flexible viewing of digital video data is highly desirable, several mechanisms for implementing TrickPlay type viewing of compressed video data have been developed.

In one example, the compressed video streams are pre-recorded onto high-density recording media in a manner that facilitates TrickPlay. One example of this is disclosed in U.S. Pat. No. 6,002,834 to Hirabayashi, et al. In Hirabayashi, MPEG files are recorded onto optical disks along with an index table indicating the memory locations of the intra-coded reference (I) frames. The index table can then be subsequently used to implement TrickPlay. While Hirabayashi facilitates the use of TrickPlay with compressed video data, Hirabayashi provides the video data on a fixed recording medium, i.e., an optical disk, wherein the data necessary to implement TrickPlay has been previously recorded.

Video signals are typically provided to PVRs as either uncompressed analog signals or digitally compressed signals such as the signals received via cable or satellite television systems. While some streaming systems have been disclosed that provide video streams with redundant streams to facilitate TrickPlay (See, e.g., U.S. Pat. No. 6,065,050 to De Money), many video streams are provided as analog signals or simple MPEG files that do not have any pre-recorded files or formats for facilitating TrickPlay.

Hence, there is a need for a system for recording compressed video data in a manner that facilitates flexible display of the compressed video data. To this end, there is a need for a system that can receive a stream of video data, such as a cable or satellite television broadcast, via an interface and compress and store the signals so as to be able to implement TrickPlay of the compressed video data without requiring that the compressed video data include pre-encoded data for TrickPlay.

SUMMARY OF THE INVENTION

In one aspect, the invention comprises a digital video recording system for storing, retrieving and displaying compressed digital video data. The system comprises a video stream buffer system that receives a stream of digital video data comprising intra-coded reference frames and predictive coded reference frames. The system also comprises a storage subsystem and a storage controller that stores the stream of digital video data into the storage subsystem. The storage controller identifies a start of the intra-coded reference frames and generates an index data structure in the storage subsystem that provides data indicative of the location of at least some of the intra-coded reference frames stored in the storage subsystem. The system also includes a display controller that accesses the index data structure and the video stream in the storage subsystem to display the video stream in a TrickPlay mode. The storage subsystem is integrated into the system such that the storage subsystem is simultaneously logically coupled to both the storage controller and the display controller.

Preferably, the storage controller also identifies the start of the predictive coded reference frames and further generates the index data structure so that the index data structure provides data indicative of the location of at least some of the predictive coded reference frames stored in the storage subsystem. Also, in one embodiment, the storage controller further stores in the index data structure data corresponding to the extent of each frame.

In another aspect, a method of storing, retrieving and displaying compressed digital video data using a personal video recording having an integrated memory storage subsystem and a display is provided. The method comprises receiving a video stream comprising intra-coded reference frames and predictive-coded reference frames and identifying the intra-coded reference frames upon receipt of the video stream. The method further comprises generating an index data structure from the identified intra-coded reference frames and storing the index data structure in the integrated storage subsystem of the personal video recorder. The method further comprises using the index data structure in the integrated storage subsystem of the personal video recorder to cause delivery of selected frames of the stored video stream to the display of the personal video recorder to thereby display the video stream in a TrickPlay mode. In one embodiment, generating the index data structure further comprises storing an extent value indicative of the extent of the data corresponding to the intra-coded reference frames.

In yet another aspect of the invention, the present invention comprises a system for storing, retrieving and displaying digital video data. In this aspect, the system comprises a video stream buffer system that receives a stream of digital video data comprising sequence header data, intra-coded reference frames and predictive-coded reference frames and a storage system. The system also includes a storage controller that stores the stream of digital video data into the storage system, wherein the storage controller generates an index data structure in the storage system as the stream of digital video data is being stored in the storage system, and wherein the index data structure includes data indicative of the location where the intra-coded reference frames are stored in the storage system and the extent of the intra-coded reference frames. The system also includes a display controller that accesses the index data structure and the video stream stored in the storage system to display the video stream in a TrickPlay mode, wherein the display controller uses the extend of the frame to limit access of a selected frame to only the data corresponding to the selected frame to thereby more efficiently access the selected frame and wherein the storage system is integrated into the system such that the storage system is simultaneously logically coupled to both the storage controller and the display controller.

BRIEF DESCRIPTION OF THE DRAWINGS

FIG. 3 is a table illustrating the logical structure of the MPEG frame header information that is received by the digital video storage and display system of FIG. 1;

DETAILED DESCRIPTION OF THE PREFERRED EMBODIMENT

Figure 1:
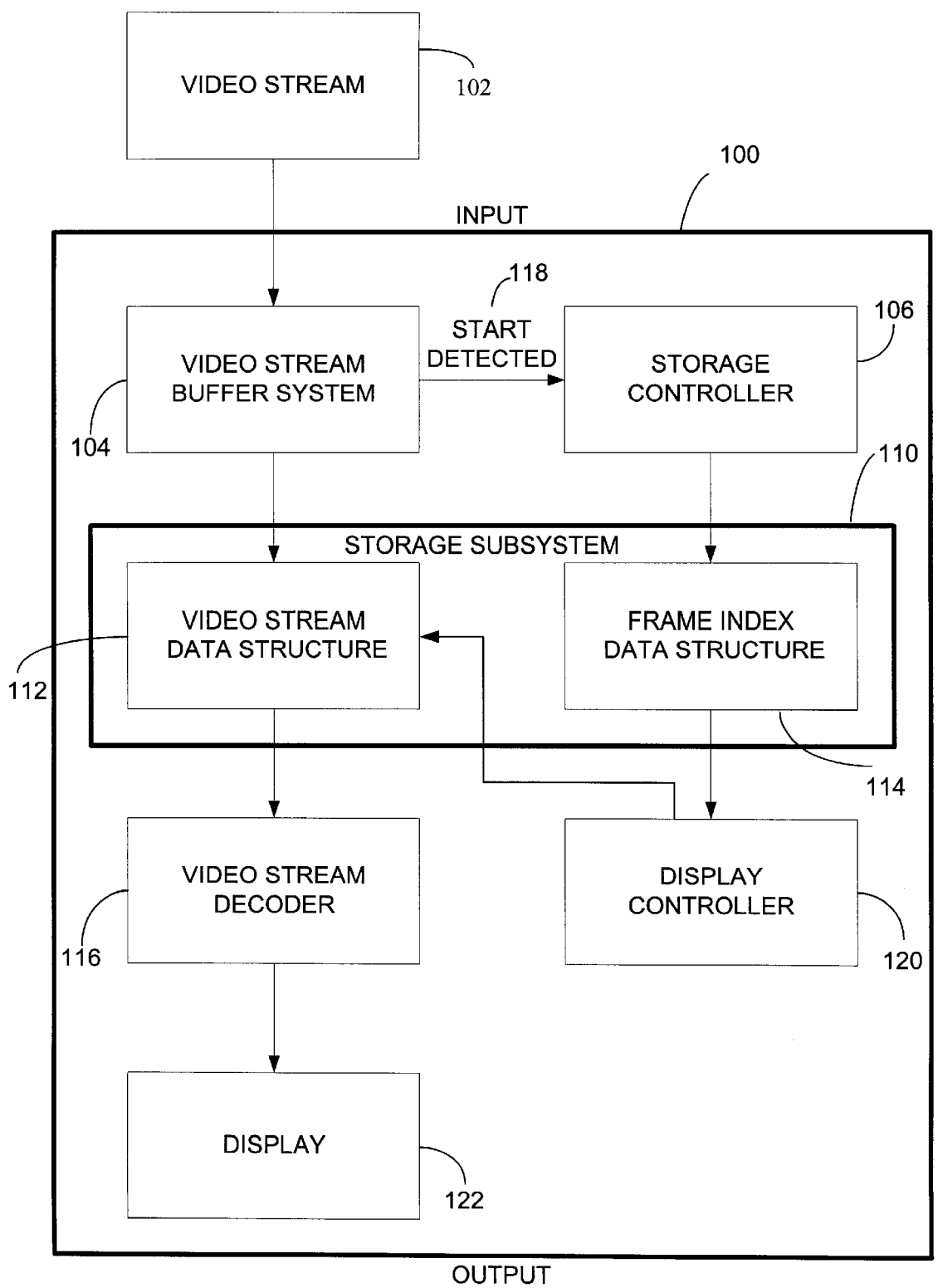
FIG. 1 is a block diagram illustrating a digital video storage and display system of the preferred embodiment.

Reference will now be made to the drawings wherein like numerals refer to like parts throughout. FIG. 1 is a block diagram illustrating the basic logical and physical components of a digital video storage and display system 100 of the preferred embodiment. In this particular embodiment, the system 100 receives a video stream 102. The video stream 102 provides compressed digital video data to the system 100 via any of a number of known interfaces and sources, such as cable or satellite television networks or the Internet. In one embodiment of the invention, the video stream 102 is already digitally encoded in the MPEG format. In an alternative embodiment, the video stream 102 is initially provided as an analog signal and is digitized and encoded in MPEG format by an MPEG encoder of a type well known in the art prior to reception by the digital video storage and display system 100. As will be described in greater detail below, the system 100 is suitable for implementation on a PVR such that MPEG data can be received from external sources and stored in such a fashion that the data can be subsequently retrieved by the system 100 in a manner that facilitates TrickPlay.

In particular, the system 100 is capable of receiving the video stream 102 comprising compressed digital frames corresponding to visual frames via a communications network, such as a cable or satellite television network. The video stream 102 preferably comprises a series of digital frames that include intra-coded reference frames which contain sufficient data to allow for reproduction of the image embodied in the frame without requiring data from other frames. Moreover, the video stream 102 also includes predictive-coded reference frames, which contain digital data but require data from other frames to permit reproduction of the image embodied in the predictive-coded frame, and sequence header data to define the display formatting information for the stream.

The MPEG video stream 102 uses a known standard for encoding video and audio signals so as to facilitate compression. The MPEG video stream 102 comprises a plurality of I-frames 103, P-frames 105, and B-frames 107 (FIG. 3) sequentially arranged in a well-known manner. The I-frames 103 are known intra-coded reference independent frames. The P-frames 105 are known predictive-coded reference frames that depend upon preceding I-frames 103 or other P-frames 105. The B-frames 107 are known bi-directionally dependent frames that reference preceding and subsequent frames in the MPEG stream 102. The structures of the I-frames 103, P-frames 105, and B-frames 107 are well known, but will be described in greater detail below in reference to the table of FIG. 3.

Figure 6:
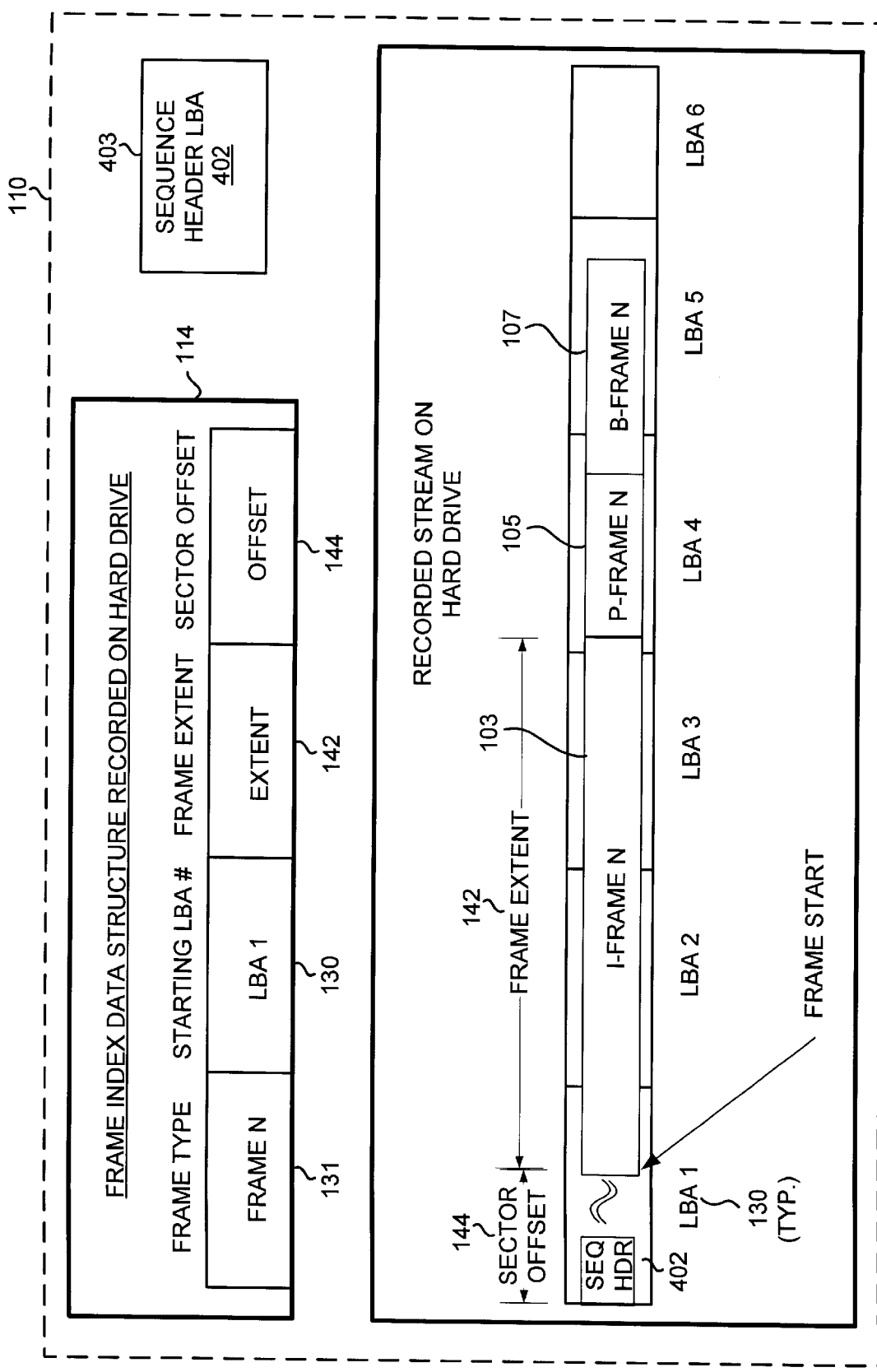
FIG. 6 is a diagram which illustrate the data structures of the digital video stream and the frame index data structure as it is stored in the storage subsystem of the system of FIG. 1.

The MPEG video stream 102 is organized into at least one sequence 400 indicated by a sequence header 402 (FIG. 6). The sequence 400 begins with the sequence header 402 followed by a plurality of frames 103, 105, and 107. The sequence header 402 is identified by a unique sequence header start code 403 of 00 00 01 B3 (hex) and comprises subsequent sequence header 402 information pertaining to the horizontal and vertical size of the pictures, aspect ratio information, and the frame and bit rate codes. The sequence header 402 provides the initial formatting information to a video stream decoder 116 required to initiate display of the MPEG video stream 102 and to change channels to thereby enable the video stream decoder 116 to properly display the MPEG stream 102.

The system 100 is functionally depicted in FIG. 1, and it will be appreciated that the logical blocks of FIG. 1 comprise functional blocks that can be implemented in hardware, software, or in both. Moreover, it will be appreciated that the exact implementation of the logical blocks of the digital video storage and display system 100 as illustrated in FIG. 1 can be implemented in any of a number of well-known manners. As is illustrated in FIG. 1, the digital video storage and display system 100 includes a video stream buffer system 104 that receives the video stream 102 via an interface. The video stream buffer system 104 buffers the incoming digital video stream 102 and provides the video stream 102 to a storage subsystem 110 such that the video stream 102 can be stored in a video stream data structure 112. The video stream buffer system 104 also determines the start of sequence headers 402 and the start of each frame 103, 105, 107 and provides a start detected signal 118 indicative thereof to a storage controller 106 to allow the storage controller 106 to develop a frame index data structure 114 in the storage subsystem 110 in a manner that will be described in greater detail below.

The storage controller 106 develops an index of the logical memory address of the start of the frames 103, 105, 107 within the video stream 102 to permit subsequent display of the video stream 102 in a TrickPlay mode in a manner that will be described in greater detail below in reference to FIG. 7. In one embodiment, the index developed by the storage controller 106 contains the locations of the I-frames 103 only. Alternatively, the frame index data structure 114 comprises an index of the locations of all of the frames 103, 105, 107 of the MPEG video stream 102.

As discussed above, the digital video storage and retrieval system 100 also includes a storage subsystem 110 which, in this embodiment, preferably comprises a hard drive of a type known in the art. Various data structures can be assembled in the storage subsystem 110 including the video stream data structure 112 and the frame index data structure 114. The configuration of these structures will be described below in reference to FIG. 6.

As is further illustrated in FIG. 1, the digital video storage and display system 100 includes an output section that includes a video stream decoder 116, a display controller 120, and a display 122. The display controller 120 can either be implemented in software or in hardware, and it selects data from the video stream data structure 112 to be provided to the video stream decoder 116 such that the data can be decoded and provided to the display 122 to permit display of the stored video data. In the preferred embodiment, the video stream data structure 112 includes the MPEG video stream 102 that is provided to the video stream decoder 116 and decoded according to well-known MPEG decoding protocols. The decoded images can then be provided to the display 122 such that the stored image can be displayed in a known manner, such as in the PAL or NTSC television formats.

The display controller 120 also has access to the frame index data structure 114 created by the storage controller 106 such that the display controller 120 can use the frame index data structure 114 to access particular frames 103, 105, 107 within the video stream data structure 112 so as to implement TrickPlay. In this particular embodiment, TrickPlay can include any of a number of techniques of displaying the video stream 102, including fast forward, reverse play, skip ahead and skip back. One exemplary manner in which the display controller 120 implements TrickPlay on the video stream 102 stored in the video stream data structure 112 will be described below in reference to FIG. 7.

Figure 2:
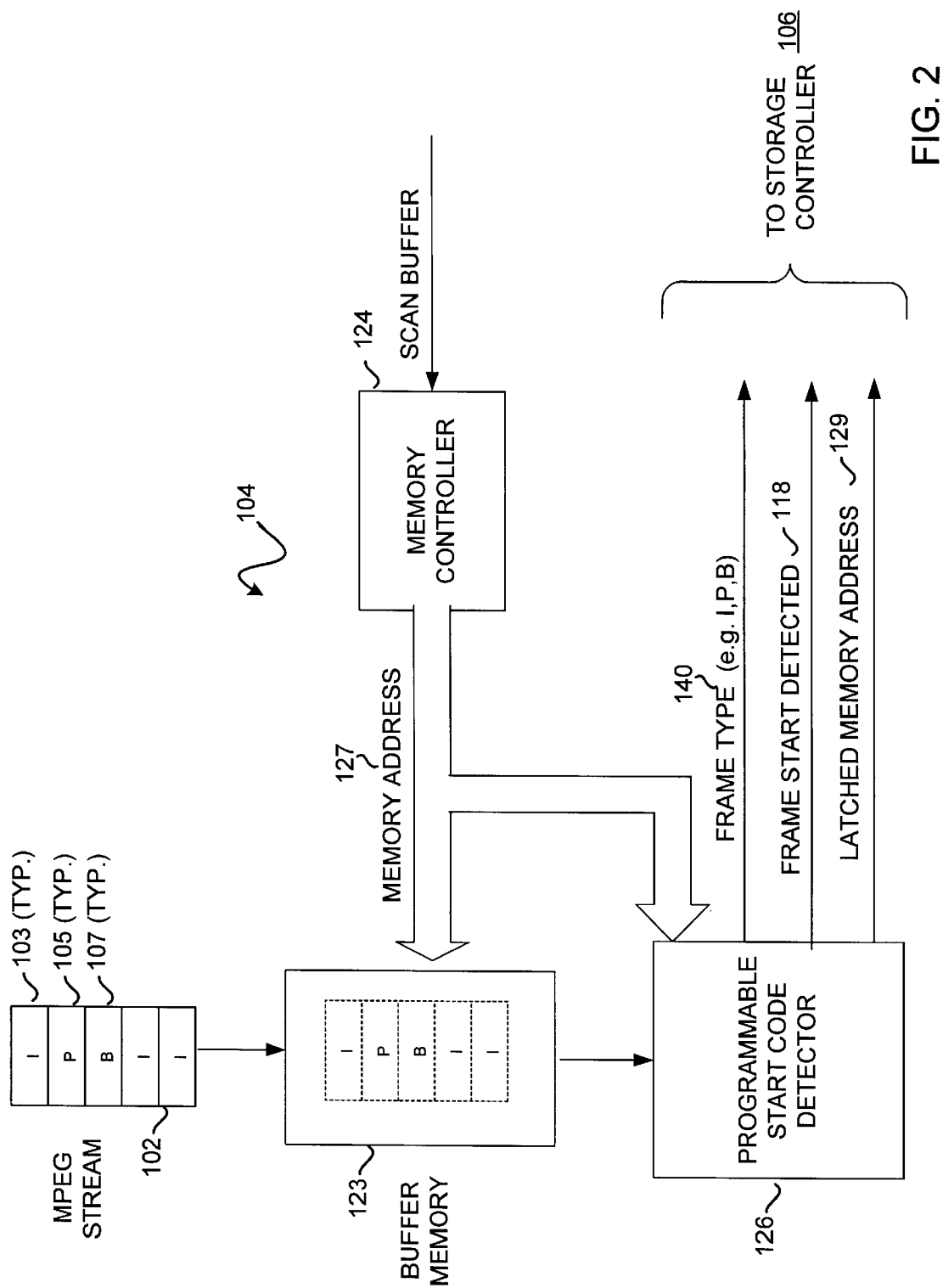
FIG. 2 is a block diagram illustrating the video stream buffer system of the digital video storage and display system of FIG. 1.

Hence, the system 100 is capable of receiving a video stream 102, such as an MPEG stream or file, and storing this stream or file into the storage subsystem 110 such as a hard drive of a PVR. The video stream 102 is stored along with the frame index data structure 114 that is created simultaneously with the storing of the video stream 102 such that the frame index data structure 114 can be subsequently used to facilitate TrickPlay modes of display of the stored video data. The video stream buffer system 104 is illustrated in greater detail in conjunction with FIG. 2. As shown in FIG. 2, as the video stream 102 is received by the system 100, the video stream 102 is first stored in a buffer 123. The buffer 123, in this embodiment, is a random access memory (RAM) array that temporarily stores the MPEG stream 102 signals in a known manner. The video stream buffer system 104 further includes a memory controller 124 that analyzes the incoming MPEG video stream 102 and controls writing to the storage subsystem 110. In response to a scan buffer input, the memory controller 124 writes video stream 102 data to the video stream data structure 112. The video stream data structure 112 comprises a hard drive memory, and the memory controller 124 is writing the video stream 102 data to the sectors of the hard drive. Each of the sectors of the hard drive has a corresponding logical block address (LBA) 130 that can be readily determined. As will be discussed in greater detail below, once the start of a frame 103, 105, 107 is identified, the corresponding LBA 130 of the sector of the hard drive can also be determined and stored in the frame index data structure 114. Moreover, the system 100 can also optionally determine an offset 144 (FIG. 6) between the start of a particular sector of the hard drive and the actual place within the sector in which data from a frame 103, 105, 107 is recorded by determining the number of usable bytes between the start of a sector and the actual byte location at which the frame 103, 105, 107 begins. Similarly, the system 100 can also determine an extent 142 of the frame 103, 105, 107. Both the offset 144 and extent 142 can be subsequently used by the display controller 120 to improve the efficiency of decoding the stored MPEG video stream 102.

As shown on FIG. 2, as the MPEG video stream 102 is received, the MPEG video stream 102 is analyzed by a programmable start code detector 126. The programmable start code detector 126 of this embodiment is a hardware comparator circuit that is adapted to identify start codes for frames 103, 105, 107 and the sequence header 402. As will be discussed in greater detail hereinbelow, the system 100 will store in the frame index data structure 114 an indication of the start of particular frames 103, 105, 107 of the MPEG video stream 102. Moreover, the system 100 will also store the sequence header 402 information as to how the frames 103, 105, 107 are to be displayed. In order to store both of these types of information, the start codes of the sequence header 402 and the frames 103, 105, 107 must be identified. In this embodiment, the start code detector 126 is programmable such that it can be used to detect either the start of the sequence header 402 or the start of individual frames 103, 105, 107 of the video stream 102.

With respect to determining the start of a frame 103, 105, 107, once the start of a frame 103, 105, 107 has been detected by the programmable start code detector 126, a start detected signal 118 is provided to the storage controller 106, and the storage controller 106 can then determine whether the frame 103, 105, 107 comprises a frame 103, 105, 107 for which an index marker should be stored in the frame index data structure 114 to facilitate subsequent use for TrickPlay display of the stored video stream 102. The memory controller 124 controls the storage of the video stream 102 data into the video stream data structure 112 and sequentially provides the data comprising the MPEG video stream 102 to the storage subsystem 110 and the programmable start code detector 126 so as to permit identification of the beginning of picture frames 103, 105, 107.

In particular, in this embodiment, the MPEG video stream 102 includes a header 132 for each frame 103, 105 and 107 as shown in FIG. 3. The header 132 comprises a picture start code 135, a temporal reference 136 and a picture coding type 140. The picture start code 135 is a unique 32-bit word that identifies the start of the frame 103, 105 or 107. The picture start code 135 of this embodiment for the start of each frame 103, 105, or 107 is 0x00000100 where "0x" indicates that the subsequent digits are presented in a hexadecimal format. The temporal reference 136 is a 10-bit code providing temporal information for the following frames 103, 105 or 107 and, in this embodiment, is a "don't care" value. The picture coding type 140 is a 3-bit code for the type of frame 103, 105, or 107 to follow. A picture coding type 140 of "001" indicates that an I-frame 103 is to follow, a "010" indicates that a P-frame 105 is to follow, and a "011" indicates a B-frame 107 is to follow. Following the picture coding type 140, the MPEG video stream 102 includes compressed image and interleaved audio signal data appropriate to the particular frame 103, 105, 107 encoded in a well-known manner.

Hence, as shown in FIG. 2, the video stream buffer system 104 sequentially receives data that indicates both the start of a particular frame 103, 105, 107 and that also indicates the type of frame 103, 105, 107. This information is provided to the programmable start code detector 126 which provides the start detected signal 118 to the storage controller 106 indicative of the start of a frame 103, 105, 107. Moreover, the frame-type information, as indicated by the picture coding type 140, is also provided to the storage controller 106 such that the storage controller 106 can determine the particular start of the frame 103, 105, 107 and also the type of the frame 103, 105, 107.

Figure 4:
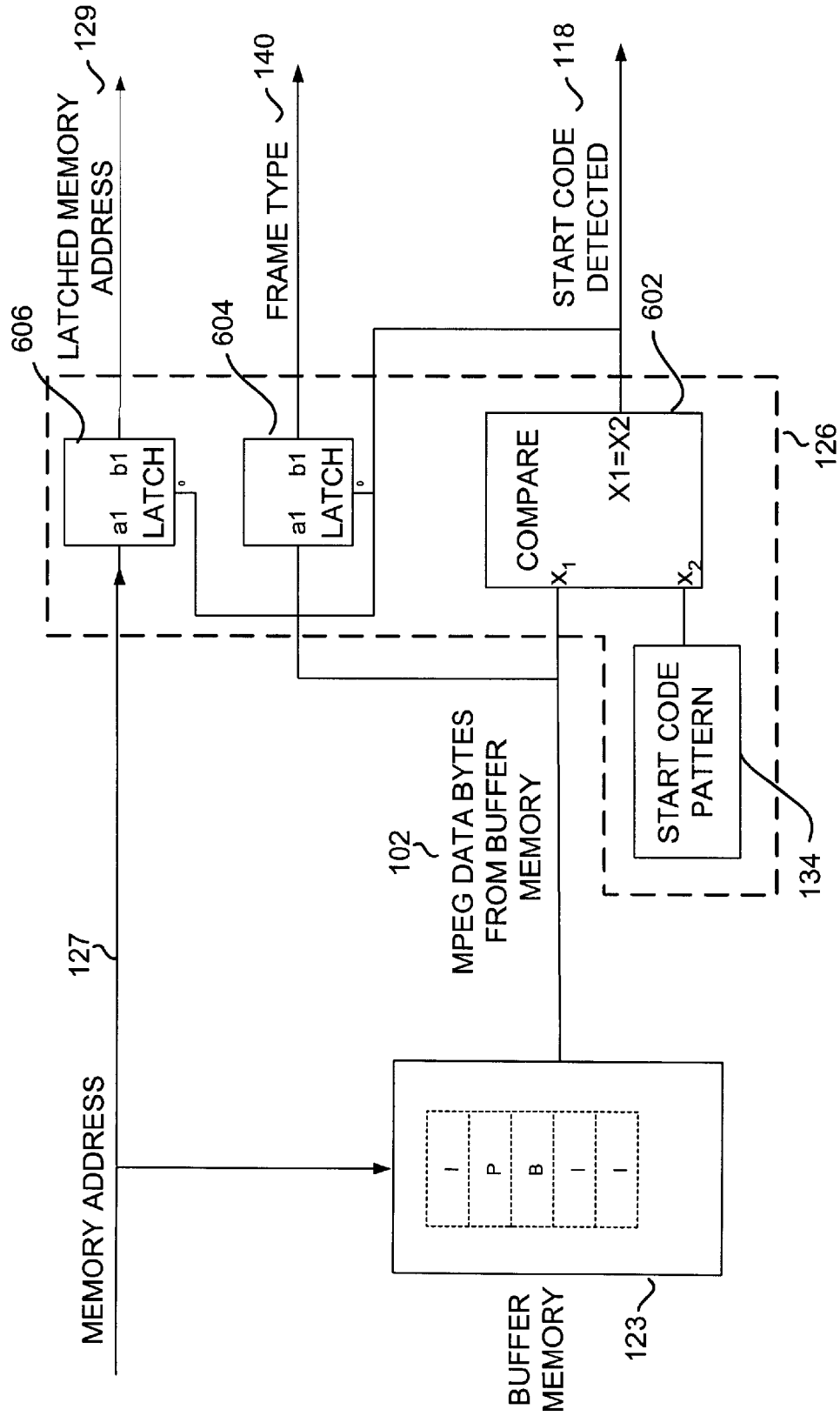
FIG. 4 is a block diagram illustrating the components and operation of the programmable start code detector of the video stream storage subsystem of FIG. 2.

FIG. 4 illustrates one embodiment of the programmable start code detector 126 which, in this embodiment, includes a 32-bit hardware comparator 602 and a programmable start code register 134. The incoming MPEG stream 102 is sequentially provided to the comparator 602 and the digital data contained therein is first compared to a programmed sequence header start code 403 contained within the start code register 134. In this embodiment, the detection of the sequence header start code 403 in the incoming MPEG stream 102 sends the start detected 118 interrupt to a memory address latch 606 to cause the memory address latch 606 to store a corresponding buffer memory address 127 of the start of the sequence header 402 in the storage subsystem 110 so that the corresponding LBA 130 can be determined and stored in the storage subsystem 110 in a manner that will be described in greater detail below. The system 100 then reprograms the start code register 134 of the programmable start code detector 126 with the picture start code 135 of 0x00000100.

When the incoming MPEG stream 102 matches the picture start code 135 contained within the start code register 134 for the start of a particular frame 103, 105, 107, the comparator 602 outputs the start detected 118 signal to the storage controller 106 indicating that the start of a frame 103, 105, 107 has been detected. In this embodiment, the detection of a picture start code 135 in the incoming MPEG stream 102 sends the start detected interrupt 118 to the memory address latch 606 to cause the memory address latch 606 to store the corresponding buffer memory address 127 of the start of the frame 103, 105, 107 so that the corresponding LBA 130 can be determined from a latched memory address 129 and stored in the index data structure 114 in a manner that will be described in greater detail below. The start detected 118 signal also causes a frame type latch 604 to latch the 3-bit picture coding type 140 so that the corresponding LBA 130 and the frame type 103, 105, 107 can be stored in the frame index data structure 114 in the manner that will be described in greater detail hereinbelow.

In this embodiment, the start codes 135, 403 are detected with the dedicated hardware comparator 602 instead of using software to facilitate a more rapid identification of the sequence header 402 and the start of a frame 103, 105, 107 in the MPEG video stream 102. It will be appreciated that the hardware comparator 602 of the programmable start code detector 126 can further be implemented to evaluate the bits indicating the picture coding type 140 to determine whether the frame is an I-frame 103, a P-frame 105, or a B-frame 107.

Using the buffer memory addresses 127, the storage controller 106 and the memory controller 124 can determine the logical block address (LBA) 130 of the frames 103, 105, 107 being stored in the video stream data structure 112 such that these LBAs 130 can be stored in the frame index data structure 114 in the manner that will be described in greater detail below. In particular, FIG. 5 illustrates the process by which the video stream buffer system 104 and the storage controller 106 store the video stream 102 in the video stream data structure 112 and produce the frame index data structure 114.

Figure 5:
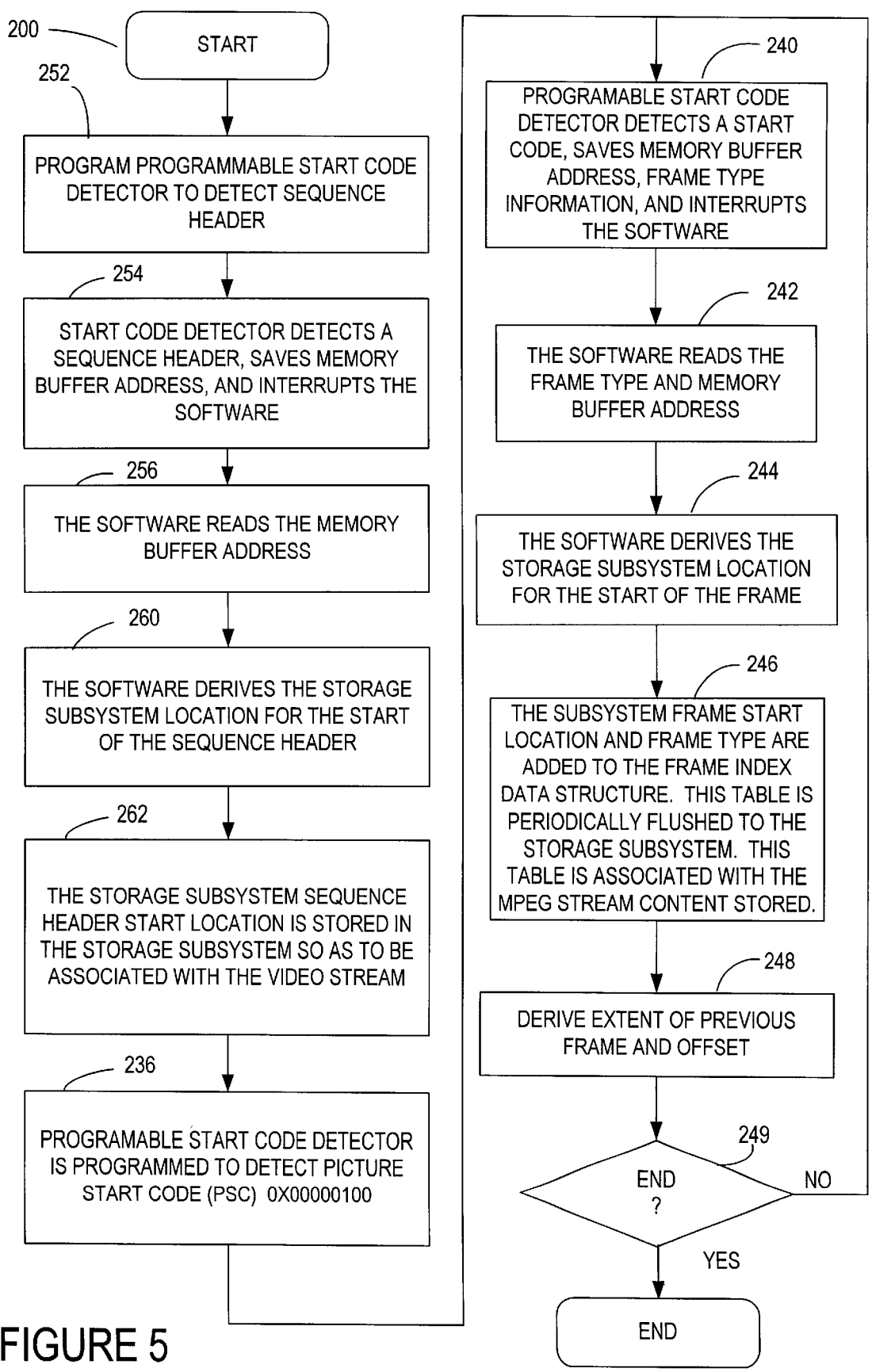
FIG. 5 is a flow chart illustrating the creation of a frame index data structure by the system of FIG. 1 as the digital video data stream is being stored in the video stream storage subsystem of FIG. 1.

As indicated in FIG. 5, the programmable start code detector 126 is first programmed to detect the sequence header start code 403 in state 252. The system 100 then in state 254 detects a sequence header 402, saves the corresponding buffer memory address 127, and interrupts the software in the manner previously described. The software then reads the buffer memory address 127 in state 256 and derives the LBA 130 for the start of the sequence header 402 in state 260. Then, the start location LBA 130 of the sequence header 402 as stored in the storage subsystem 110 is stored in the storage subsystem 110 in state 262 so as to be associated with the video stream data structure 112.

Then the start code register 134 of the programmable start code detector 126 is reprogrammed in state 236 to detect the picture start code 135. The programmable start code detector 126 in state 240 detects the picture start code 135, saves the buffer memory address 127, the frame type 140 information, and sends the interrupt to the software comprising the storage controller 106 in the manner described above in connection with FIG. 4.

The software comprising the storage controller 106 then reads the frame type 140 information and the buffer memory address 127 in state 242 and derives the storage subsystem location for the start of the frame 103, 105, 107 in state 244. The buffer memory address 127 is the address in the buffer 123 of the picture start code 135 as it is being stored in the video stream data structure 112 by the memory controller 124 (FIG. 4). Hence, the storage controller 106, by knowing the buffer memory address 127 can thus determine the sector of the hard drive in which the picture start code 135 is being stored. The sector is, in this embodiment, identified as a logical block address (LBA) 130.

Then, in a state 246, the storage controller 106 periodically adds the LBA 130 of the start location of the frames 103, 105, 107 to the frame index data structure 114 in the storage subsystem 110. In this way, the video stream buffer system 104 and the storage controller 106 can both simultaneously store the video stream data structure 112 in the storage subsystem 110 and also generate the frame index data structure 114 indicative of the sectors on the hard drive where the frame 103, 105, 107 starts can be found.

The system 100 can also determine and store in state 248 an extent 142 of the frame 103, 105, 107. The extent 142, in one embodiment, is the number of sectors of the storage subsystem 110 that the frame 103, 105, 107 at least partially occupies. As the LBAs 130 of the start location of succeeding frames 103, 105, 107 are being determined in state 244, the extent 142 of the succeeding frames 103, 105, 107 can thus be determined as the starting LBAs 130 of each frame 103, 105, 107 are known as well as the ending LBA 130 of each frame 103, 105, 107 as the ending LBA 130 corresponds to the starting LBA 130 of the next sequential frame 103, 105, 107.

As discussed above, the system 100 can also optionally determine in state 248 an offset 144 between the start of the data corresponding to the frames 103, 105, 107 and the start of the sector corresponding to the LBA 130. The offset 144 information can also be provided to the storage controller 106 such that the storage controller 106 can also store this offset 144 information in the frame index data structure 114 as is indicated in FIG. 6. The offset 144 information can be used to more efficiently access and decode the frames 103, 105, 107 during TrickPlay display of the stored MPEG video stream 102. Similarly, since the memory controller 124 is sequentially storing the data corresponding to each frame 103, 105, 107 in the video stream data structure 112, and since the programmable start code detector 126 is detecting the start of each frame 103, 105, 107, the extent 142 of each of the frames 103, 105, 107 can be determined as the byte length as opposed to the number of LBAs 130 occupied by the data of the frame 103, 105, 107.

As is indicated in FIG. 5, the process of states 240–249 is repeated until it is determined in decision state 249 that each of the frames 103, 105, 107 has been stored in the video stream data structure 112 and the corresponding index marker has been generated in the index data structure 114. In this way, as the frames 103, 105, 107 are being stored in the video stream data structure 112, the LBAs 130 of the start of each frame 103, 105, 107 can also be stored in the storage subsystem 110 and organized into the frame index data structure 114 for future access for TrickPlay applications.

The preferred manners in which the video stream 102 is stored in the video stream data structure 112 and in which the frame index data structure 114 and the video stream data structure 112 are stored within the storage subsystem 110 are schematically illustrated in FIG. 6. The frame index data structure 114 comprises a series of entries that includes the LBAs 130 of the start of the frames 103, 105, 107 of the MPEG video stream 102 stored in the storage subsystem 110. In this particular embodiment, the storage subsystem 110 comprises a hard drive incorporating one or more magnetic disks. The video stream data structure 112 includes a series of sectors identified by LBAs 130 corresponding to each of the frames 103, 105, 107, which provides logical addresses corresponding to the physical location of the digital data corresponding to the particular frame 103, 105, 107 as stored on the storage subsystem 110. The storage of this data onto the hard drive is accomplished in a manner that is known in the art.

In particular, the hard drive has a plurality of tracks that are divided into a plurality of sectors on the disk that are digitally encoded. Each block stores approximately 512 bytes of information that can be accessed in a known manner provided the LBA 130 of the particular sector is known. The data is sequentially written onto the tracks of the hard drive. Since an LBA 130 identifies a unique sector, the LBAs 130 can thus be used to access desired data such as the start of the sequence 400 or the frames 103, 105, 107.

As is illustrated in FIG. 6, the frame index data structure 114 includes a frame type field 131 that indicates the type of frame 103, 105, 107 for which the index data is stored. As discussed above, in one embodiment, the start locations of each of the frames 103, 105, 107 of the video stream is stored in the frame index data structure 114. In another embodiment, only the start locations of the I-frames 103 is stored in the frame index data structure 114. By storing the start locations of either only the I-frames 103 or the start locations of all of the frames 103, 105, 107, selected frames 103, 105, 107 can be accessed more readily for display purposes. Hence, storing the start locations of either selected frames 103, 105, 107 or of all the frames 103, 105, 107 greatly facilitates TrickPlay.

As is also illustrated in FIG. 6, the frame index data structure 114 includes the starting LBA 130 which is stored in a starting LBA field 130. Similarly, the extent 142 of the frame data is also stored in a frame extent field 142. As discussed above, the extent 142 can either be the number of sectors that are occupied by the frame 103, 105, 107 data or the actual number of bytes the frame 103, 105, 107 data comprises. The extent field 142 can thus be expressed as the number of LBAs 130, the LBA 130 in which the frame 103, 105, 107 data ends, which will typically correspond to the next subsequent starting LBA 130, or the byte length of the frame 103, 105, 107.

As is also illustrated in FIG. 6, an optional sector offset data field 144 can also be included in the frame index data structure 114. The sector offset data field 144 comprises the offset 144 in the starting sector between the start of the sector and the actual start of the data corresponding to the particular frame 103, 105, 107.

The extent 142 and the offset 144 are provided to the display controller 120 to improve the efficiency with which the digital video storage and display system 100 can access frames 103, 105, 107 within the video stream data structure 112. Hence, the system 100 preferably creates the frame index data structure 114 that has the LBA 130, offset 144, and extent 142 corresponding to each of the frames 103, 105, 107. This information can then be used to more efficiently decode and display the frames 103, 105, 107 for TrickPlay implementations.

The storage subsystem also includes a data structure 403 which has a reference to the LBA 130 of the sequence header 402. As discussed above, the sequence header 402 includes information which is needed by the display controller to be able to display the frames 103, 105, 107 of the video stream 102. The sequence header 402 information is thus stored in the storage subsystem 110 in a location that is associated with the frame index data structure 114 such that the sequence header 402 in the hard drive can be more readily accessed.

Figure 7:
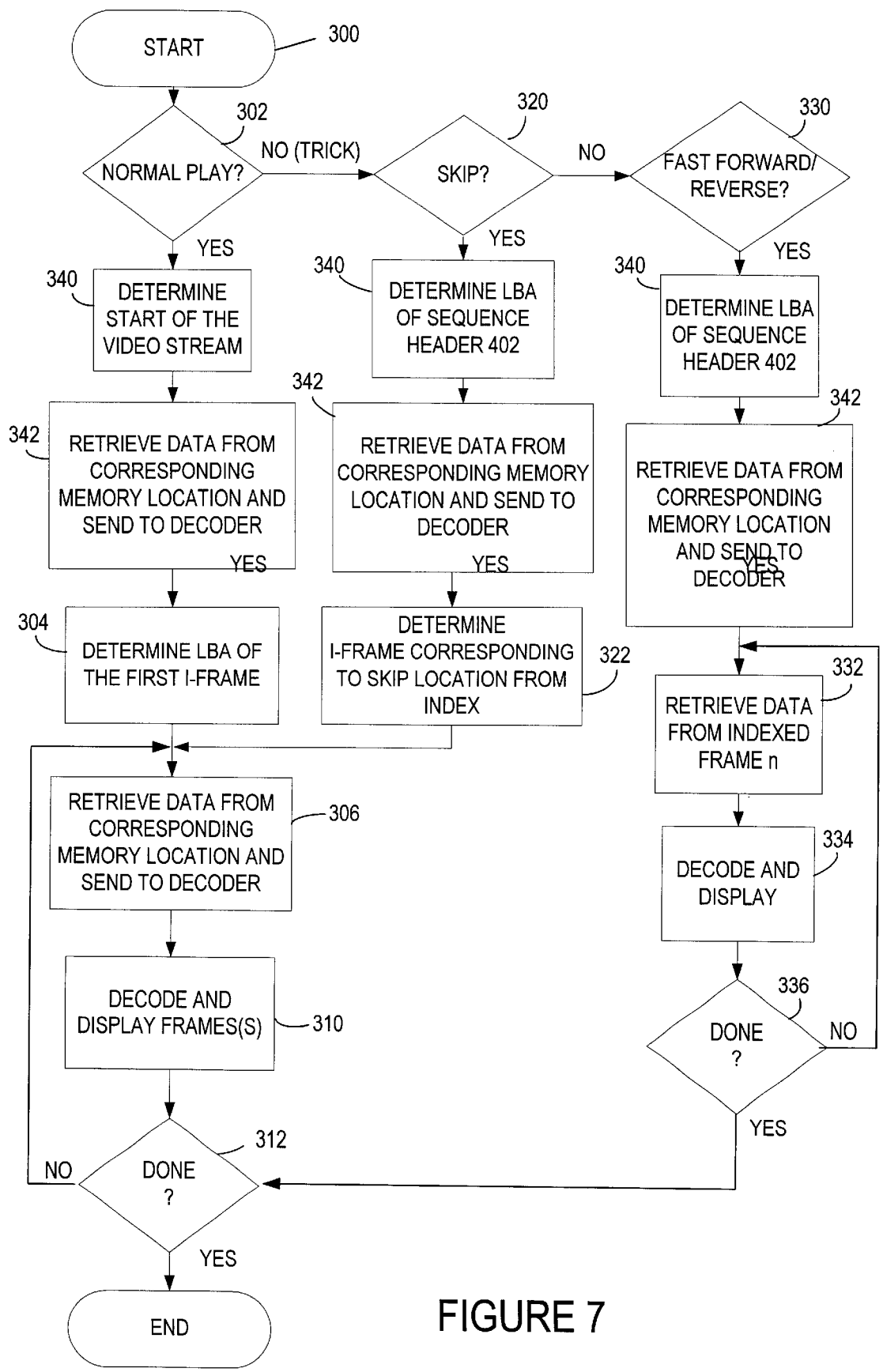
FIG. 7 is a flow chart illustrating the operation of the digital video storage and display system of FIG. 1 as the stored data is retrieved and displayed in either a normal or TrickPlay mode.

FIG. 7 is a flow chart that illustrates exemplary modes of operation of the display controller 120 as it displays the video stream 102 stored in the video stream data structure 112. It will be appreciated that the flow chart of FIG. 7 illustrates one advantageous implementation and that other implementations may also be used.

As discussed above, the display controller 120 has access to the video stream data structure 112 such that the display controller 120 can provide the data contained therein to a video stream decoder 116. The video stream decoder 116 decodes the video stream 102 information and provides the decoded information to the display 122 in a known manner. Similarly, the display controller 120 also has access to the frame index data structure 114 such that the display controller 120 can use this information to facilitate implementation of TrickPlay of the video stream 102 data contained within the video stream data structure 112.

After a start state 300, the display controller 120 determines the mode of display of the video stream 102 in decision state 302. If the display controller 120 determines in the decision state 302 that the mode of display is normal play, the display controller 120 then determines, in a state 340, the LBA 130 of the start of the sequence header 402. Then, in a state 342, the display controller 120 retrieves the sequence header 402 from the storage subsystem 110 and sends the sequence header 402 to the video stream decoder 116. Then, in a state 304, the display controller 120 determines the LBA 130 of the start of the video stream 102 stored within the video stream data structure 112 in a known manner.

Then, in a state 306, the data is retrieved from the corresponding memory location within the storage subsystem 110 and is provided to the video stream decoder 116. The video stream decoder 116 then decodes and displays the initial frame 103 and subsequent frames 103, 105, 107 in state 310 according to the known decoding and display protocols of the MPEG standard. After the display of each frame 103, 105, 107, the display controller 120 determines, in a decision state 312, whether the display of the video stream 102 is completed. It will be appreciated that the video stream 102 display is completed when either the entire sequence has been displayed or when the display controller 120 receives an interrupt signal from a user input in a well-known manner. The display controller 120 in normal play mode repeats steps 306–310 for each of the frames 103, 105, 107 stored within the video stream data structure 112. In this manner, the video stream 102 can be displayed to a user in a known manner.

If the display controller 120 determines, in the decision state 302, that a TrickPlay mode of operation has been selected, the display controller 120 then accesses the data in the frame index data structure 114 that is stored in the storage subsystem 110 as previously described. It will be appreciated that the display controller 120 may receive input signals from a user via an input, such as a keyboard or a graphical user interface (GUI), so as to identify when TrickPlay has been activated by the user. It will also be appreciated that the exact implementation of TrickPlay by the display controller 120 can comprise a number of different implementations of which only a skip implementation and a fast forward/reverse implementation are illustrated in FIG. 7.

In particular, if the display controller 120 determines in a state 320 that a skip TrickPlay has been implemented, the display controller 120 then determines, in state 340, the LBA 130 of the start of the sequence header 402. Then, in state 342, the display controller 120 retrieves the sequence header 402 from the storage subsystem 110 and sends the sequence header 402 to the video stream decoder 116. The display controller 120 then determines the I-frame 103 that corresponds to the skip location selected by the user in a state 322. Basically, in skip play, the user can indicate the portion of the video stream 102 that the user would like to see displayed using an input device in a known manner. The display controller 120 then determines in state 322 the most adjacent I-frame 103 corresponding to the desired temporal location within the video stream 102.

The frame index data structure 114 provides the LBA 130 corresponding to the selected I-frame 103 corresponding to the desired skip location such that the I-frame 103 data can then be provided to the video stream decoder 116 and displayed from that point in a normal play mode in states 306–310 in the manner previously described. In one embodiment, the display controller 120 can display this I-frame 103 to the user as a still shot. Hence, the display controller 120 is able to determine an I-frame 103 which corresponds to a skip location that the user has selected and then initiate the decoding and the display of the video stream 102 stored in the video stream data structure 112 from that I-frame 103.

As discussed above, the index data structure 106 in one embodiment includes not only the LBA 130 at which the start of the frames 103, 105, 107 are located but also the offset 144 and the extent 142. The decoding of the frames 103, 105, 107 by the display controller 120 and the video stream decoder 116 can thus be performed more efficiently. In particular, knowing the offset 144 permits decoding of the data corresponding to the frames 103, 105, 107 to begin with the actual data as opposed to the data occurring at the beginning of the sector that corresponds to the LBA 130, but which may not be related to the frame 103, 105, 107.

Similarly, knowing the extent 142 of the frames 103, 105, 107 allows the display controller 120 to activate the video stream decoder 116 so as to decode only the data that correspond to the frames 103, 105, 107 that are being provided out of the video stream data structure 112. It will be appreciated that the data is being provided sequentially and the typical way of determining the end of the frames 103, 105, 107 is to begin to decode the next frame 103, 105, 107 and identify the next 32-bit picture start code 135. By knowing the length of the usable data corresponding to the frames 103, 105, 107, the efficiency of decoding the frames 103, 105, 107 can be enhanced as the end point of the frames 103, 105, 107 will already be known without having to process additional bytes of data to determine the start of the next frame 103, 105, 107.

The display controller 120 can also implement a fast forward/reverse TrickPlay mode of display of the video stream 102 if the display controller 120 determines, in a decision state 330, that such a TrickPlay mode of display has been selected by the user. In this embodiment, the display controller 120 determines, in state 340, the LBA 130 of the start of the sequence header 402. Then, in state 342, the display controller 120 retrieves the sequence header 402 from the storage subsystem 110 and sends the sequence header 402 to the video stream decoder 116. Then, in a state 332, the display controller 120 sequentially retrieves, the data corresponding to the indexed frames 103, 105, 107 1 through n, as listed in the frame index data structure 114 and decodes and displays each of these I-frames 103 in a state 334 until the fast forward is determined to be completed in decision state 336. In one embodiment, each of the I-frames 103 is decoded and displayed to the user in the same manner as described above, which results in a fast forward that is significantly faster than the normal decoding and display rate of the MPEG video stream 102. It will be appreciated that the I-frames 103 alone may be displayed or, in an alternative embodiment, the I-frames 103 and selected following P-frames 105 may be displayed so as to provide more refined visual data to the user but will still result in faster display of the video data. It will be further appreciated that fast forward and fast reverse can be easily implemented by incrementing or decrementing a counter corresponding to the particular I-frame 103 that is to be retrieved from the video stream data structure 112 and decoded by the video stream decoder 116.

From the foregoing, it will be appreciated that because an index of the start locations of the frames 103, 105, 107 has been compiled into the storage subsystem 110 during the storage of the video stream 102, the start locations can then be used to access particular frames 103, 105, 107 within the video stream 102. As discussed above, the index frames are preferably the I-frames 103 which allow for TrickPlay, such as fast forward, fast reverse and skipping to a particular start location.

Hence, the system 100 allows for both storage and display of digital video data such as MPEG files and streams. The system 100 has an integrated storage subsystem 110 that is logically coupled to both the storage controller 106 and the display controller 120. Thus, the storage controller 106 is capable of developing the frame index data structure 114 that is stored in the storage subsystem 110 that is accessible by the display controller 120 so as to allow the display controller 120 to implement more efficient flexible display of the stored video stream 102. The Trickplay modes of display described here illustrate several of the different types of TrickPlay displays that can be implemented using the frame index data structure 114 and should not be viewed as limiting the implementation of this invention.

The preferred embodiment can thus be implemented on existing personal video recorders (PVRs) allowing for TrickPlay display of streaming video by causing the PVR to develop the frame index data structure 114 from a simple MPEG video stream 102 as the video stream 102 is received. Hence, there is no requirement that the video stream 102 include previously encoded TrickPlay tables which increases the efficiency of transmission of the video stream 102 while still permitting display that is more flexible.

What is claimed is:

1. A digital video recording system for storing, retrieving, and displaying compressed digital video data, comprising:
   a video stream buffer system that receives a stream of digital video data comprising intra-coded reference frames and predictive-coded reference frames;
   a storage subsystem that is logically organized into a plurality of logical block addresses that identify sectors of the storage system;
   a storage controller that stores the stream of digital video data into the storage subsystem, wherein the storage controller identifies a start of the intra-coded reference frames and generates an index data structure in the storage subsystem that provides data indicative of the location of at least some of the intra-coded reference frames stored in the storage subsystem wherein the data in the index data structure indicates the logical block address of the start of the intra-coded reference frame and the offset from the beginning of the intra-coded reference frame and the beginning of the corresponding logical block address; and
   a display controller that accesses the index data structure and the video stream in the storage subsystem to display the video stream in a TrickPlay mode, wherein the storage subsystem is integrated into the system such that the storage subsystem is simultaneously logically coupled to both the storage controller and the display controller.

2. The system of claim 1, wherein the storage controller identifies the start of the predictive coded reference frames and further generates the index data structure so that the index data structure provides data indicative of the location of at least some of the predictive coded reference frames stored in the storage subsystem.

3. The system of claim 1, wherein the storage subsystem comprises a personal video recorder hard drive.

4. The system of claim 3, further comprising a start code detector that receives the stream of digital video data further comprising sequence and frame header information and that provides a signal to the storage controller when the start code detector identifies the start of a frame.

5. The system of claim 4, wherein the start code detector comprises a comparator that compares header information contained within the digital video data to a code that corresponds to the start of a sequence or a frame to identify the start of a sequence or a frame.

6. The system of claim 4, wherein the storage controller stores in the index data structure data corresponding to the logical block address of the start of each frame identified by the start code detector thereby identifying where the start of each frame is stored on the hard drive.

7. The system of claim 4, wherein the storage controller, upon receiving a signal indicative of the start of a frame, analyzes the header information of the digital video data corresponding to the frame and determines whether the frame is an intra-coded reference frame.

8. The system of claim 7, wherein the storage controller further stores in the index data structure data corresponding to the extent of each frame.

9. The system of claim 9, wherein the display controller accesses the index data structure to identify the start of each frame to thereby implement TrickPlay display of the stored video stream.

10. The system of claim 9, wherein the display controller, in response to an input from a user, uses the index data structure to access a selected intra-coded reference frame stored on the hard drive corresponding to a skip location selected by the user to cause the decoding and display of the selected intra-coded reference frame.

11. The system of claim 9, wherein the display controller, in response to an input from a user, uses the index data structure to access a plurality of intra-coded reference frames to cause the decoding and display of the plurality of intra-coded reference frames to thereby implement a fast forward display of the video stream.

12. The system of claim 9, wherein the display controller, in response to an input from a user, uses the index data structure to access a plurality of intra-coded reference frames to cause the decoding and display of the plurality of intra-coded reference frames to thereby implement a fast reverse display of the video stream.

13. A method of storing, retrieving, and displaying compressed digital video data using a personal video recorder having an integrated memory storage subsystem that is organized into a plurality of sectors identified by a plurality of corresponding logical block addresses and a display, the method comprising:

receiving a video stream comprising intra-coded reference frames and predictive-coded reference frames;

identifying the intra-coded reference frames upon receipt of the video stream;

generating an index data structure from the identified intra-coded reference frames and storing the index data structure in the integrated storage subsystem of the personal video recorder;

storing the video stream in the integrated storage subsystem of the personal video recorder wherein the index data structure identifies both the logical block address of the sectors that contain the beginning of the intra-coded reference frame and the offset from the beginning of the intra-coded reference frame and the beginning of the sector corresponding to the logical block address; and using the index data structure in the integrated storage subsystem of the personal video recorder to cause delivery of selected frames of the stored video stream to the display of the personal video recorder to thereby display the video stream in a TrickPlay mode.

14. The method of claim 13, wherein receiving a video stream comprises receiving a MPEG video stream that is not modified to implement Trickplay display of the MPEG stream.

15. The method of claim 14, wherein receiving a video stream comprises receiving an MPEG video stream on a personal video recorder via a cable television network.

16. The method of claim 13, wherein using data from the index data structure to cause delivery of selected frames to the display comprises using the LBA to access the start of the intra-coded reference frames.

17. The method of claim 13, wherein generating the index data structure further comprises storing an extent value indicative of the extent of the data corresponding to the intra-coded reference frames.

18. The method of claim 17, wherein using data from the index data structure to cause delivery of selected frames to the display comprises using the length data to cause delivery of a data string having a length that corresponds to the length of the data corresponding to the intra-coded reference frames.

19. The method of claim 13, wherein TrickPlay comprises displaying the images of the video stream at a rate accelerated above the normal play rate.

20. The method of claim 13, wherein TrickPlay comprises displaying the video stream beginning at a location within the video stream other than at the beginning of the video stream.

21. The method of claim 13, wherein TrickPlay comprises displaying the images of the video stream in reverse order.

22. The method of claim 13, further comprising identifying the predictive-coded reference frames.

23. The method of claim 22, wherein generating the index data structure further comprises generating the index data structure from the identified predictive coded references frames.

24. A system for storing, retrieving and displaying digital video data, the system comprising:

a video stream buffer system that receives a stream of digital video data comprising sequence header data, intra-coded reference frames, and predictive-coded reference frames;

a storage system that is logically organized into a plurality of logical block addresses that identify sectors of the storage system;

a storage controller that stores the stream of digital video data into the storage system, wherein the storage controller generates an index data structure in the storage system as the stream of digital video data is being stored in the storage system, and wherein the index data structure includes data indicative of the location where the intra-coded reference frames are stored in the storage system and the extent of the stored intra-coded reference frames wherein the data indicative of the location of the intra-coded reference frames include data indicative of the logical block address containing the intra-coded reference frame and the offset from the beginning of the sector identified by the logical block address and the beginning of the intra-coded reference frame; and a display controller that accesses the index data structure and the video stream stored in the storage system to display the video stream in a TrickPlay mode, wherein the display controller uses the extent and the offset of the intra-coded reference frame to limit access of a selected frame to only the data corresponding to the selected frame to thereby more efficiently access the selected frame and wherein the storage system is integrated into the system such that the storage system is simultaneously logically coupled to both the storage controller and the display controller.

25. The system of claim 24, wherein the storage system comprises a hard drive of a personal video recorder (PVR).

26. The system of claim 25, further comprising a start code detector that receives the digital video data received by the input buffer, wherein the digital video data includes header information, and wherein the start code detector evaluates the header information to identify the sequence header and intra-coded reference frames.

27. The system of claim 26, wherein the storage controller generates the index data structure so that the index data structure also includes data indicative of the location of at least some of the predictive coded reference frames stored in the storage subsystem.

28. The system of claim 24, wherein, for each intra-coded reference frame, the storage controller determines the offset between the start of the sector and the actual location where the data corresponding to the start of the intra-coded reference frame is stored in the sector, and wherein the storage controller further stores an offset value indicative of this offset.

29. The system of claim 28, wherein, for each intra-coded reference frame, the storage controller determines the extent of the data stored in the hard drive and stores in the index data structure an extent value indicative of the extent of the stored frame data.

30. The system of claim 29, wherein the display controller, in response to a user input, accesses the logical block address of a selected intra-coded reference frame in the index data structure to thereby access the selected intra-coded reference frame for subsequent decoding display of the selected intra-coded reference frame.

31. The system of claim 30, wherein the display controller further accesses the offset value for the selected intra-coded reference frame in the index data structure so that only the data in the sector corresponding to the selected intra-coded reference frame is accessed for subsequent decoding and display of the selected intra-coded reference frame.

32. The system of claim 31, wherein the display controller further accesses the extent value in the index data structure so that the display controller accesses only the data in the sectors of the hard drive that correspond to the selected intra-coded reference frames.

* * * * *